(12) United States Patent
Lin

(10) Patent No.: US 11,703,840 B2
(45) Date of Patent: Jul. 18, 2023

(54) DIMENSION TOLERANCE DETERMINING METHOD AND DIMENSION TOLERANCE DETERMINATION SYSTEM THEREOF

(71) Applicant: Jhong-Yi Lin, Taipei (TW)

(72) Inventor: Jhong-Yi Lin, Taipei (TW)

( * ) Notice: Subject to any disclaimer, the term of this patent is extended or adjusted under 35 U.S.C. 154(b) by 216 days.

(21) Appl. No.: 17/203,777

(22) Filed: Mar. 17, 2021

(65) Prior Publication Data
US 2021/0294313 A1    Sep. 23, 2021

(30) Foreign Application Priority Data
Mar. 17, 2020   (TW) ................................. 109108733

(51) Int. Cl.
*G05B 19/418*        (2006.01)

(52) U.S. Cl.
CPC ............... *G05B 19/41875* (2013.01); *G05B 2219/32193* (2013.01)

(58) Field of Classification Search
CPC .... G05B 19/41875; G05B 2219/32193; G05B 19/4184; Y02P 90/02
See application file for complete search history.

(56) References Cited

U.S. PATENT DOCUMENTS

| 6,708,073 | B1* | 3/2004 | Heavlin | ............ H01L 21/67276 700/121 |
|---|---|---|---|---|
| 2003/0113641 | A1 | 6/2003 | Leidy et al. | |
| 2014/0005977 | A1 | 1/2014 | Wu et al. | |

FOREIGN PATENT DOCUMENTS

| CN | 1750007 A | 3/2006 |
|---|---|---|
| CN | 103143661 A | 6/2013 |
| CN | 106960101 A | 7/2017 |

* cited by examiner

*Primary Examiner* — Manuel A Rivera Vargas

(57) ABSTRACT

A dimension tolerance determining method and a system are disclosed. The method includes: determining initial tolerances of parts in assembled product; generating a plurality of tolerance data sets according to initial tolerances of parts, each tolerance data set containing a calculated part tolerance of each part; inputting the plurality of tolerance data sets into a key parameter generation module to generate a plurality of key parameters corresponding to the assembled product, wherein each key parameter corresponds to one tolerance data set; when the key parameters are located within a design range, calculating a plurality of assembly yield rates based on the tolerance data sets corresponding to the key parameters located within the design range; and selecting the tolerance data set corresponding to one of the assembly yield rates as the tolerances of the parts in the assembled product; wherein the key parameter generation module includes a neural network model.

4 Claims, 8 Drawing Sheets

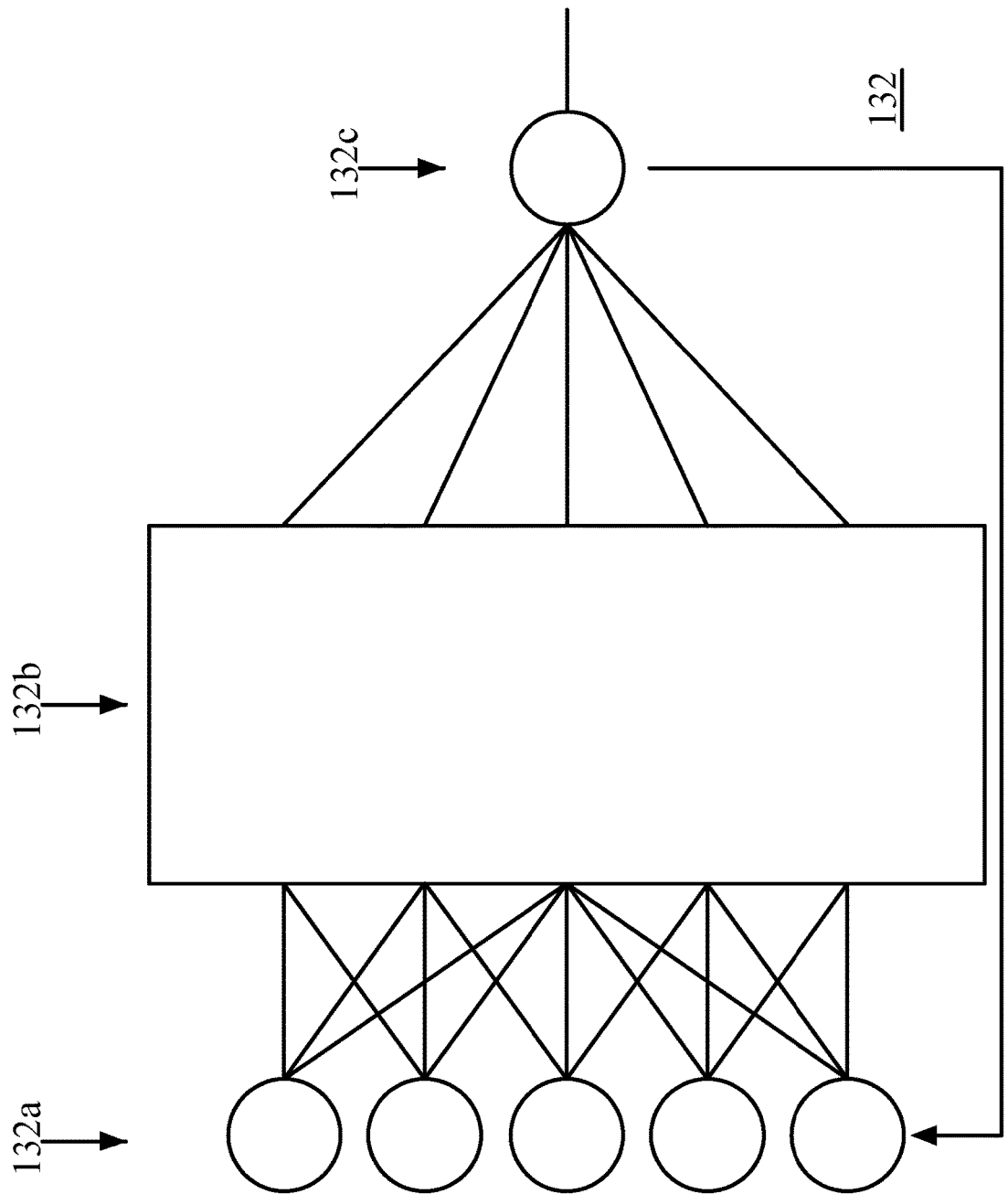

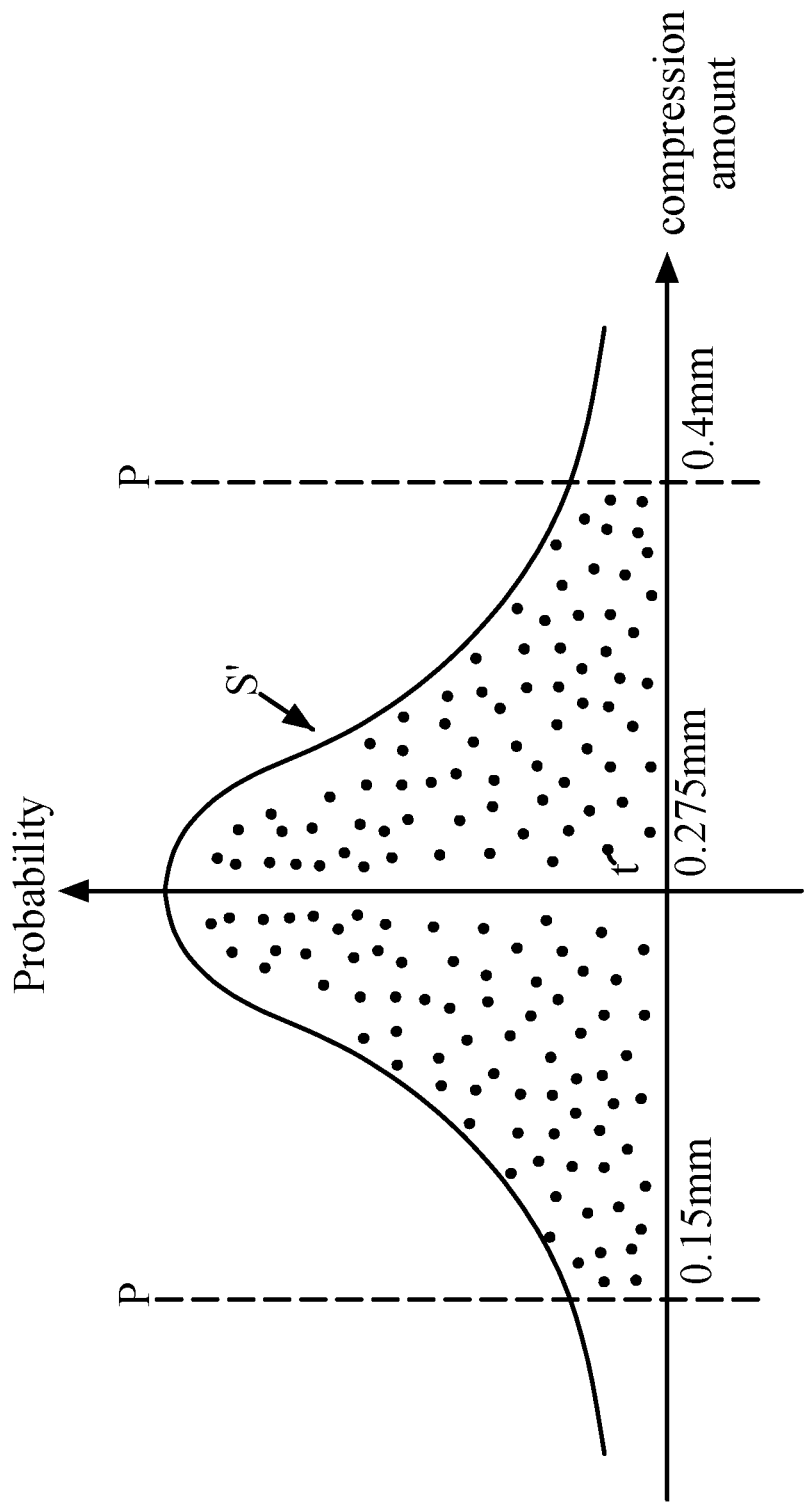

DIMENSION TOLERANCE DETERMINING METHOD AND DIMENSION TOLERANCE DETERMINATION SYSTEM THEREOF

BACKGROUND OF THE INVENTION

Field of the Invention

The present invention relates to a method and a system for determining dimension tolerance, in particular to a dimension tolerance determining method and a dimension tolerance determination system using a neural network.

Description of Related Art

Dimension tolerance is abbreviated as tolerance, which refers to the allowable machining error. It is defined as the absolute value of the difference between the maximum limit dimension and the minimum limit dimension, or the difference between the allowable upper deviation and the lower deviation. The dimension tolerance refers to the allowable amount of variation in the dimension of the parts during machining. Under the same basic dimension, the smaller the dimension tolerance, the higher the dimension precision, and the relatively high cost and equipment required for manufacturing. Therefore, when designing, the tolerances of all parts of the assembled product must be determined. When a product is designed, it will design functional requirements of the product, that is, its functionality. In the design stage, all dimensions are basic dimensions, and the basic dimensions are the basis of the design.

Almost all products are composed of several to many parts, and each part has a dimension and a tolerance interval. At this time, we must consider whether the assembly gap or assembly functionality of the product itself can meet requirements of the product itself. As long as the object needs to be manufactured, the dimension must be marked and then machined according to the drawings. There will be errors in machining. The reasonable range of errors is the tolerance range that must be considered during design, so as to avoid serious interference coordination or transitional cooperation during assembly of finished parts. Tolerance analysis mainly uses analysis methods to simulate assembly problems faced by the product during assembly of parts through dimensions and tolerances of part features, so as to prevent the parts from affecting the functionality and appearance quality of the products due to accumulation of tolerances exceeding the design target value during the assembly process, or causing problems such as poor assembly and production of waste products. The main modes of tolerance analysis methods are Worst-Case Method Analysis and Statistical Model Analysis, wherein the Statistical Model Analysis is also called a RSS mode or a probability method.

However, no matter the Worst-Case Method Analysis or the Statistical Model Analysis, its effectiveness still deserves improvement. Therefore, whether there is a better method and system for determining dimension tolerances is a subject worthy of consideration by those with ordinary knowledge in the field.

SUMMARY OF THE INVENTION

The objective of the present invention is to provide a method and a system for determining dimension tolerance to optimally determine the dimension tolerance. The dimension tolerance determining method of the present invention is suitable for determining tolerances of various parts in an assembled product. The dimension tolerance determining method includes the following steps:

step (a): determining initial tolerances of the parts in the assembled product;

step (b): generating a plurality of tolerance data sets according to the initial tolerances of the parts, each tolerance data set containing a calculated part tolerance of each part;

step (c): inputting the plurality of tolerance data sets into a key parameter generation module to generate a plurality of key parameters corresponding to the assembled product, wherein each key parameter corresponds to one of the tolerance data sets;

step (d): when the key parameters generated in the step (c) are located within a design range, calculating a plurality of assembly yield rates based on the tolerance data sets corresponding to the key parameters located within the design range; and step (e): selecting the tolerance data set corresponding to one of the assembly yield rates as the tolerances of the parts in the assembled product;

wherein the key parameter generation module comprises a neural network model.

The dimension tolerance determination system of the present invention is suitable for determining tolerances of parts in an assembled product. The dimension tolerance determination system includes an input module, a tolerance generation module, a key parameter generation module, and an assembly yield calculation module. The input module is suitable for a user to input initial tolerances of the parts in the assembled product. The tolerance generation module is electrically connected to the input module. The tolerance generation module is configured for generating a plurality of tolerance data sets according to the initial tolerances of the parts, each tolerance data set containing a calculated part tolerance of each part. The key parameter generation module is electrically connected to the tolerance generation module. The key parameter generation module is configured for generating a plurality of key parameters corresponding to the assembled product according to the plurality of tolerance data sets, wherein each key parameter corresponds to one of the tolerance data sets. The assembly yield calculation module is electrically connected to the key parameter generation module. The assembly yield calculation module is configured for selecting a key parameter located within a design range, and for calculating a plurality of assembly yield rates based on the tolerance data sets corresponding to the key parameters located within the design range. The key parameter generation module includes a neural network model.

In summary, the dimension tolerance determining method and the dimension tolerance determination system of the present invention use neural network technology for determining the tolerances of parts, thereby effectively improving the yield rate of assembled products.

BRIEF DESCRIPTION OF THE DRAWINGS

Aspects of the present invention are best understood from the following detailed description when read with the accompanying figures. The exemplary embodiments of the present invention and the description thereof are used to explain the present invention, and do not constitute improper limitations on the preset invention. In the drawings:

FIG. 5 is a diagram of a neural network model.

FIG. 6A and FIG. 6B are diagrams showing a dimension error distribution range of a heat dissipation pad.

DESCRIPTION OF THE PREFERRED EMBODIMENTS

In order to enable the above objects, features and advantages of the disclosure to be more apparent and easily understood, the specific embodiments of the disclosure will be further elaborated hereafter in connection with the drawings.

In the following, an assembled product composed of some parts in a notebook computer will be used as an example to illustrate a dimension tolerance determining method and a dimension tolerance determination system of the present invention. However, those with ordinary knowledge in the filed should understand that the dimension tolerance determining method and the dimension tolerance determination system of the present invention can be applied to tolerances of parts in various assembled products, and are not limited to the assembled products composed of parts in the notebook computer described in the following embodiments.

Figure 1:
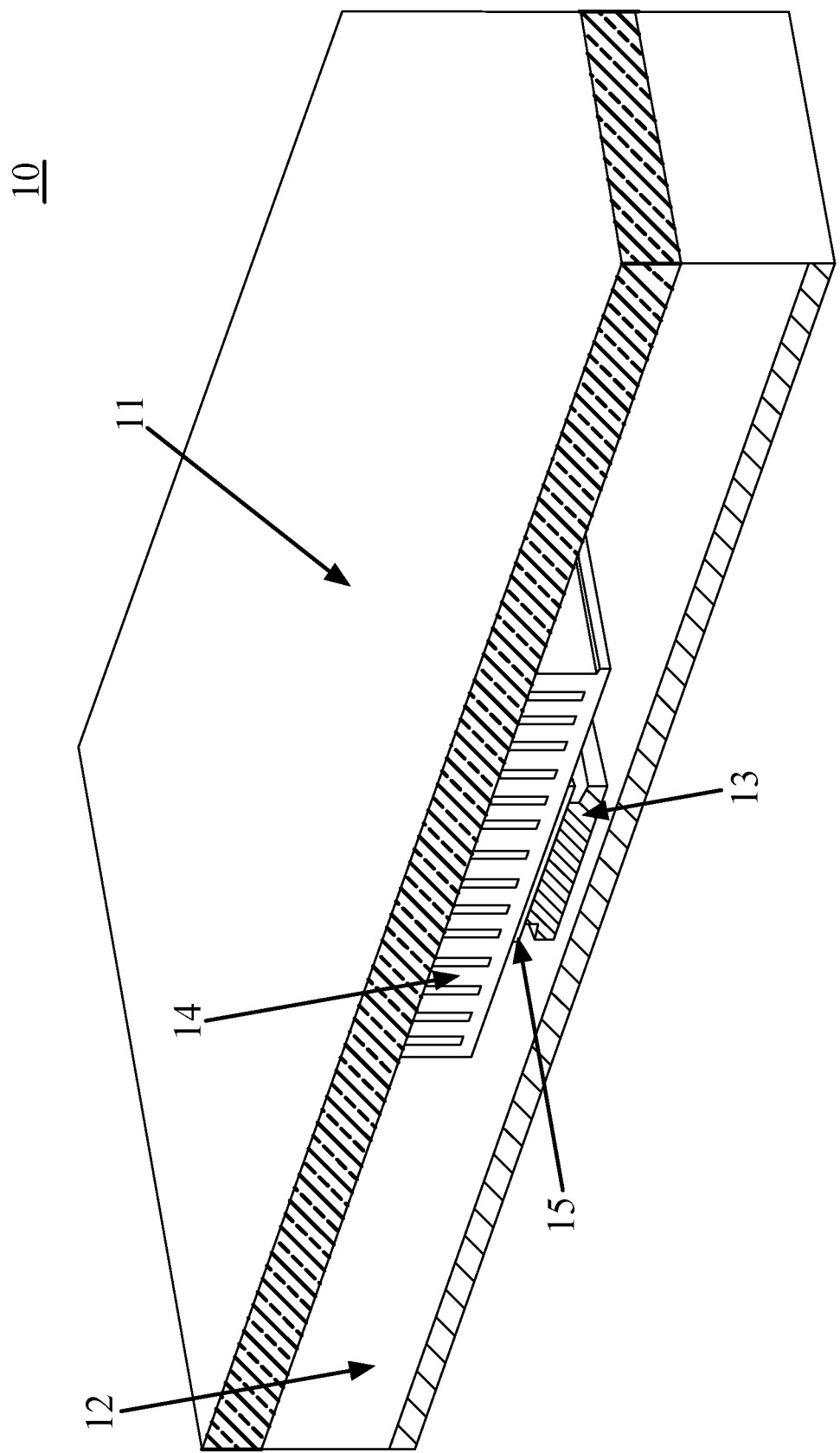
FIG. 1 is a diagram of an assembled product composed of some parts in a notebook computer.

Please refer to FIG. 1. FIG. 1 is a diagram of an assembled product composed of some parts in a notebook computer. The assembled product 10 includes a casing 11, a circuit board 12, a central processing unit (CPU) 13, a heat sink 14, a heat dissipation pad 15. The CPU 13 is disposed on the circuit board 12, and the heat dissipation pad 15 is sandwiched between the heat sink 14 and the CPU 13. During assembling, the dissipation pad 15 must have a certain amount of compression, so as to ensure tight contact between the heat dissipation pad 15 and the heat sink 14 and between the heat dissipation pad 15 and the CPU 13, for effectively discharging the heat generated by the CPU 13. However, the various parts of the notebook computer, such as the casing 11, the circuit board 12, the CPU 13, the heat sink 14, and the heat dissipation pad 15 shown in FIG. 1, will inevitably have dimension errors during manufacturing, that is, tolerances. In addition, the assembling force will also generate a certain amount of compression to the parts more or less when assembling. If the tolerance is not properly determined, the compression amount of the heat dissipation pad 15 won't be within the predetermined range. If the compression amount of the heat dissipation pad 15 is too small, a problem of poor heat dissipation performance may occur. Conversely, if the compression amount of the heat dissipation pad 15 is too large, other parts (such as the CPU 13 or the heat sink 14) may be damaged by extra pressure. In addition, if the decision of tolerance is too strict, that is, the amount of error is small, it may lead excessive cost. Hence, how to determine the tolerances of various parts is a question worth of consideration.

Figure 2:
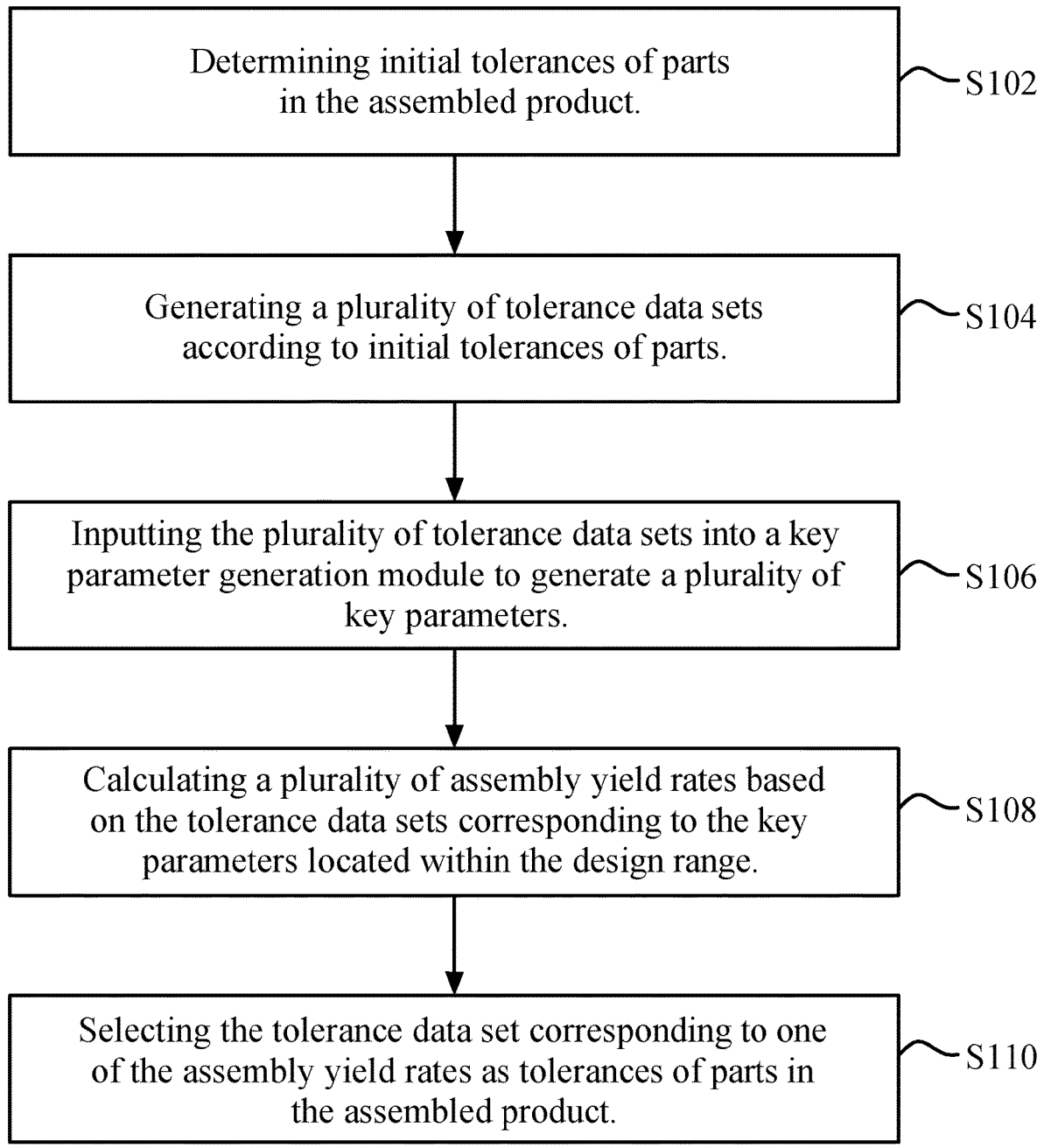
FIG. 2 is a flowchart of a dimension tolerance determining method according to an embodiment of the present invention.
Figure 3:
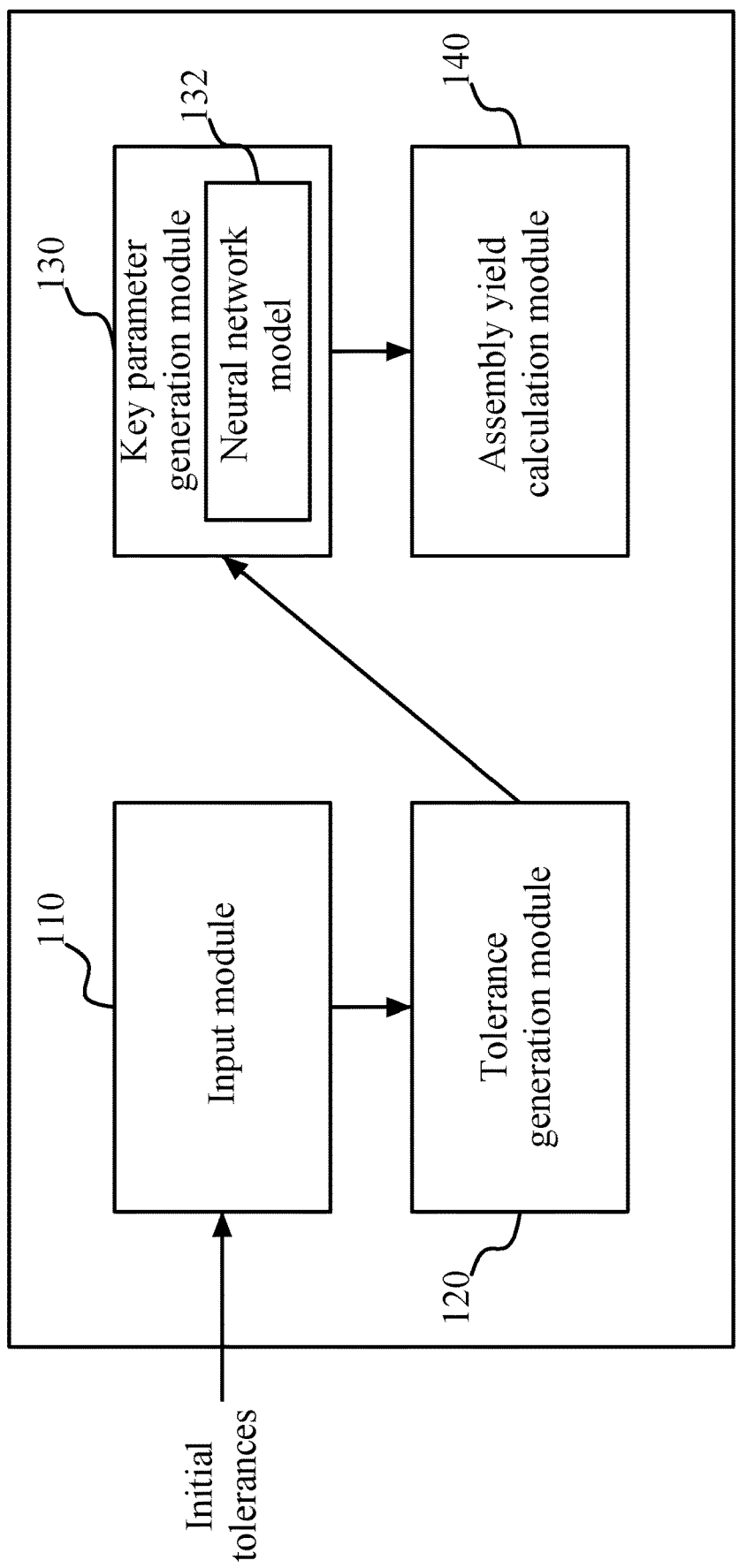
FIG. 3 is a block diagram of a dimension tolerance determination system according to an embodiment of the present invention.

Please refer to FIG. 2 and FIG. 3. FIG. 2 is a flowchart of a dimension tolerance determining method according to an embodiment of the present invention. FIG. 3 is a block diagram of a dimension tolerance determination system according to an embodiment of the present invention. Hereinafter, the dimension tolerance determination system 100 of FIG. 3 will be used to illustrate the process of the dimension tolerance determining method shown in FIG. 2, but this does not mean that the process shown in FIG. 2 can only be implemented by the dimension tolerance determination system 100 shown in FIG. 3. First, Step S102 is performed to determine initial tolerances of the parts in the assembled product 10. For example, the product designer can input the initial tolerances of the parts through an input module 110 of the dimension tolerance determination system 100. In this embodiment, the initial tolerances of the parts in the assembled product 10 are represented by a set of numbers: a1, b1, c1, d1, e1, wherein a1 represents the initial tolerance of the casing 11, b1 represents the initial tolerance of the heat sink 14, c1 represents the initial tolerance of the heat dissipation pad 15, d1 represents the initial tolerance of the CPU 13, and e1 represents the initial tolerance of the circuit board 12. For example, (a1, b1, c1, d1, e1) are (0.4, 0.2, 0.1, 0.3, 0.2), and the unit is mm. Moreover, in this embodiment, the nominal dimension of the casing 11 is 10.6 mm, the nominal dimension of the heat sink 14 is 6.25 mm, the nominal dimension of the heat dissipation pad 15 is 0.5 mm, the nominal dimension of the CPU 13 is 2.9 mm, and the nominal dimension of the circuit board is 1.2 mm. For example, when the product designer marks the dimension of the heat sink 14 on the engineering drawing, it can be marked as 0.5 mm±0.05 mm.

After inputting the initial tolerances of the parts in the assembled product 10, Step S104 is performed: generating a plurality of tolerance data sets according to the initial tolerances of the parts. In other words, after a tolerance generation module 120 receives the initial tolerances from the input module 110, a plurality of tolerance data sets is generated, wherein each tolerance data set contains a calculated part tolerance of each part. Hereinafter, how the tolerance generation module 120 of the dimension tolerance determination system 100 generates the tolerance data sets will be described.

Figure 4A:
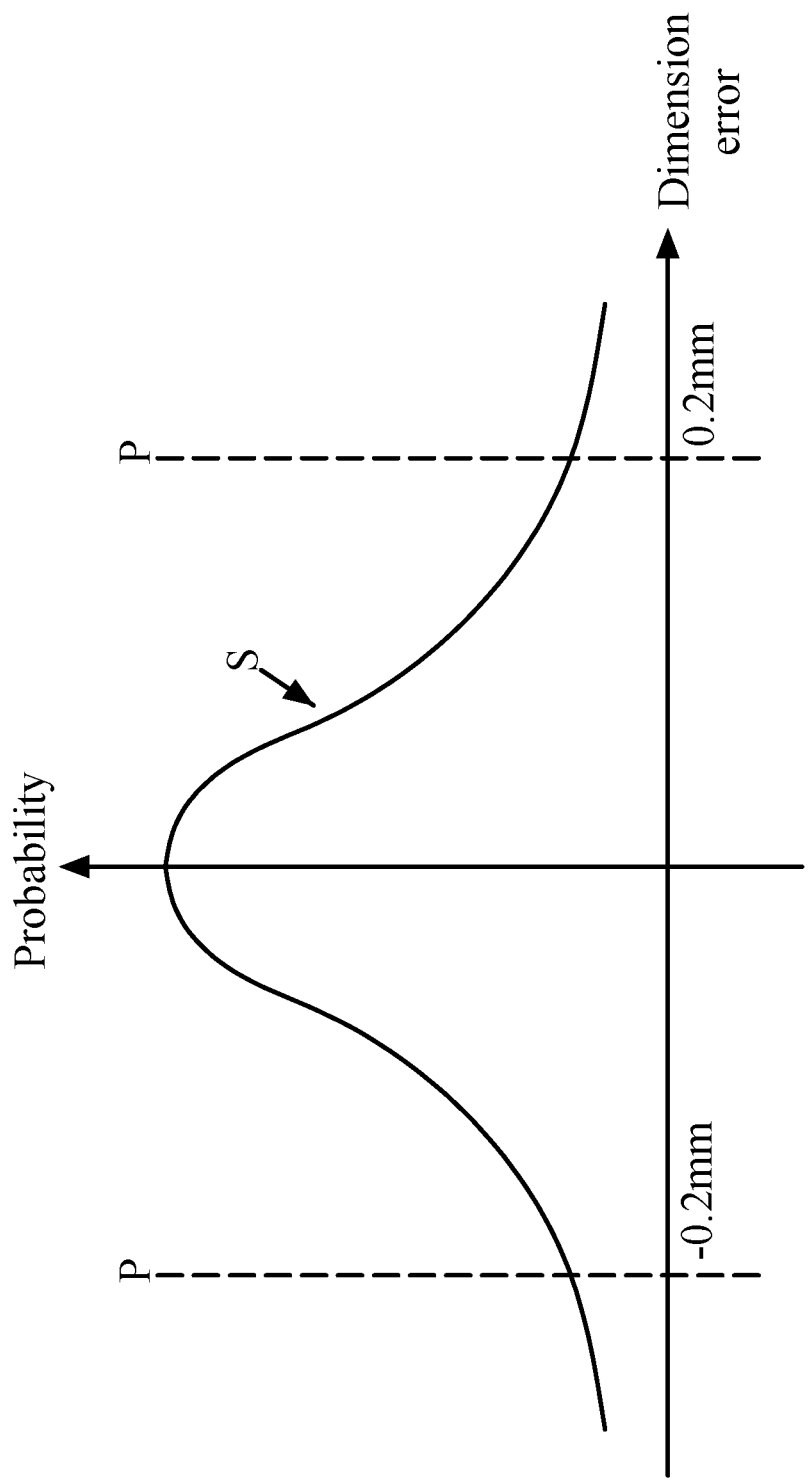
FIG. 4A and FIG. 4B are diagrams showing a dimension error distribution range of a casing.

In this embodiment, the parts of the assembled product 10 are from different upstream part vendors, and each upstream part vendor will also notify the error range when providing the parts it produced. Furthermore, the manufacturer of the assembled product 10 may also request the upstream part vendor to provide the error distribution range of the parts at the same time. For example, please refer to FIG. 4A. FIG. 4A is a diagram showing a dimension error distribution range of a casing. In FIG. 4A, the vertical axis represents probability, and the horizontal axis represents dimension error. It can be seen from FIG. 4A that the distribution curve S of the dimension error is a bell-shaped curve, and the distribution curve S is obtained by, for example, curve fitting. The distribution curve S can be a normal distribution or an abnormal distribution. In general, abnormal distributions are more common. Moreover, the distribution curve S is not necessarily provided by the upstream part vendor, and may be obtained by the manufacture of the assembled product 10 by performing statistics on historical purchase data.

Please keep referring to FIG. 4A. There are two vertical lines P drawn at two positions of the horizontal axis, and these two vertical lines P are determined by the initial tolerance. As can be known from the foregoing, the initial tolerance of the casing 11 is 0.4 mm. The tolerance is defined as: the absolute value of the difference between the maximum limit dimension and the minimum limit dimension. Since the nominal dimension is the middle value of the maximum limit dimension and the minimum limit dimension, the two vertical lines P shown in FIG. 4A are respectively located at −0.2 mm and +0.2 mm from the horizontal axis. In this embodiment, the range covered by the distribution curve S, the two vertical lines P, and the horizontal axis is the sample range for calculating the part tolerance.

Figure 4B:
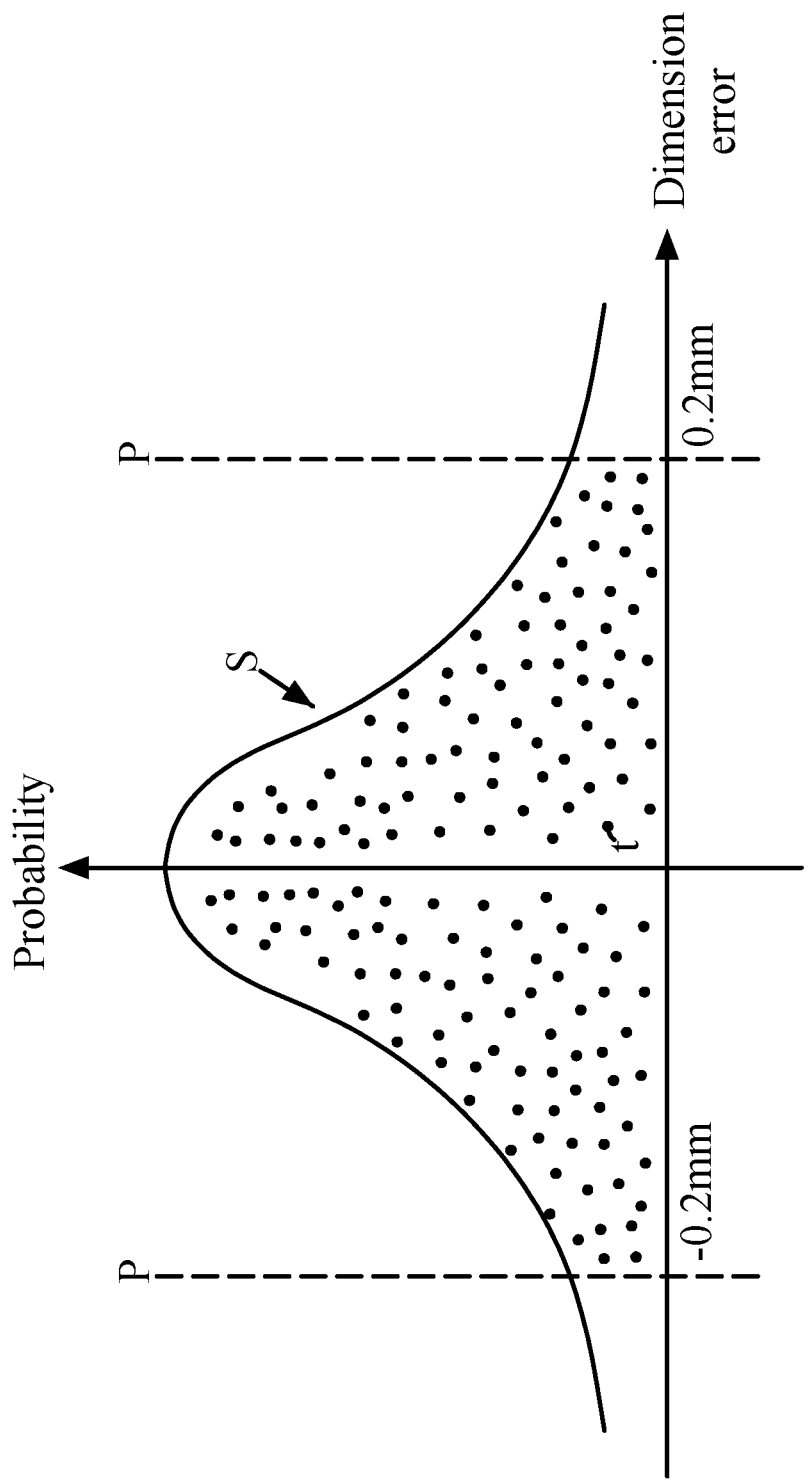

Hereinafter, the sampling method will be explained. In this embodiment, the Monte Carlo method is used to sample a random point t within the range covered by the distribution curve S, the two vertical lines P, and the horizontal axis in FIG. 4A (as shown in FIG. 4B), wherein the horizontal axis value corresponding to each random point t is the calculated part tolerance. In FIG. 4A, the casing 11 is taken as an example for illustration, but those with ordinary knowledge in the art should understand that each part has its corresponding distribution curve S and the vertical lines P, so the random points t can be sampled in the same sampling way described above for generating a calculated part tolerance for each part. In this embodiment, the calculated part tolerances of the casing 11, the heat sink 14, the heat dissipation pad 15, the CPU 13, and the circuit board 12 are respectively a2, b2, c2, d2, and e2, wherein a set constituted by these five numbers is called as the tolerance data set. A plurality of random points t is sampled for each part, and thus a plurality of tolerance data sets are generated in Step S104. For example, in this embodiment, 5000 tolerance data sets are generated.

Please continue to refer to FIG. 2 and FIG. 3, so as to proceed to Step S106. The plurality of tolerance data sets (a2, b2, c2, d2, e2) obtained in Step S104 is inputted into a key parameter generation module 130. The key parameter generation module 10 includes a neural network model 132 (as shown in FIG. 5). The key parameter generation module 130 is used to generate key parameters, and the key parameter is a parameter used to measure whether a product meets a certain quality. In this embodiment, the key parameter is the compression amount of the heat dissipation pad 15 after assembling of the assembled product 10 is completed. Since the relationship between the tolerances of the parts and the compression amount of the heat dissipation pad 15 is not clear, it is difficult to express it with a clear mathematical formula, and it is quite suitable to use a neural network model to determine the relationship therebetween. In this embodiment, this neural network model is e a Back-propagation neural network.

Please refer to FIG. 5 at the same time. FIG. 5 is a diagram of a neural network model. The neural network model 132 includes an input layer 132a, at least one hidden layer 132b, and an output layer 132c. In this embodiment, the input layer 132a has five neurons, which represent the five calculated part tolerances of a2, b2, c2, d2, and e2, respectively. Furthermore, although the hidden layer 132b is represented by a square in FIG. 5, those skilled in the art should understand that the hidden layer 132b is composed of at least one neuron layer, wherein each neuron layer is composed of a plurality of neuros.

In the training process of the neural network model 132, for example, the Levenberg-Marquardt algorithm is used, which has a faster convergence speed than general gradient descent methods. The Levenberg-Marquardt algorithm can obtain a lower mean square error than other algorithms, so it is also called the nonlinear least square method. Moreover, the training data can be actual measured data. The actual measured data can be historical data measured by the manufacturer of the assembled product 10, or historical data measured by a plurality of manufacturers. In the training process, the more data is input, the better the performance of the neural network model 132 is. However, the training data can't be too much, otherwise there may be overfitting. Generally speaking, the data required in the training process may be 10,000 sets, 30,000 sets, or 50,000 sets.

Figure 6A:
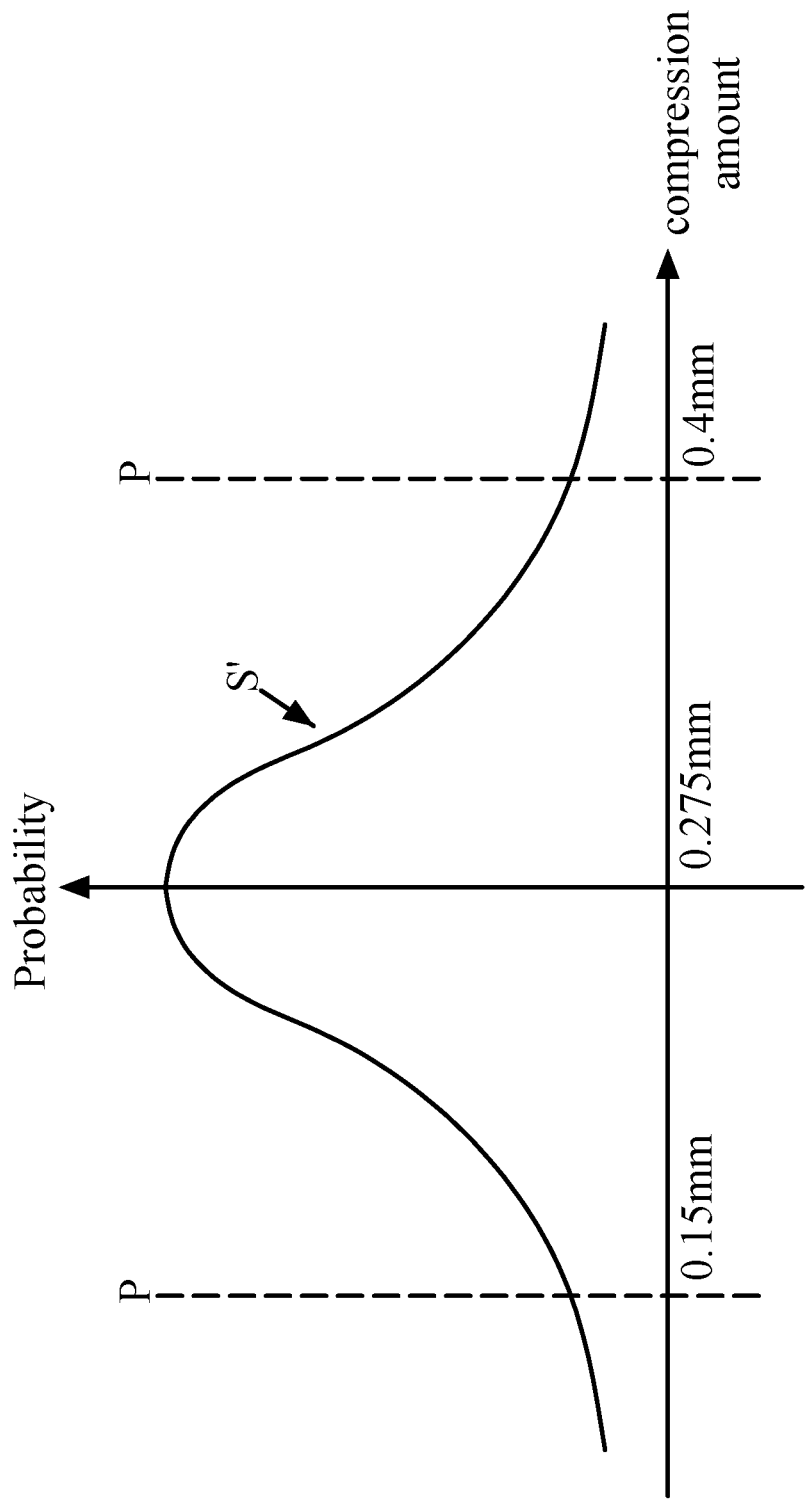

However, under a condition that the actual measured data is limited, simulation can also be used to generate more data. For example, after measuring a plurality (such as, hundreds) of actual compression amounts of the heat dissipation pad 15, a curve fitting method can be used to generate a distribution curve similar to the distribution curve S' shown in FIG. 6A. In FIG. 6A, the vertical axis represents the probability, the horizontal axis represents the compression amount of the heat dissipation pad 15, and the origin represents the design center value of the compression amount. Then, a random point t within the range covered by the distribution curve S' and the horizontal axis is sampled by the Monte Carlo method (as shown in FIG. 6B), wherein the horizontal axis value corresponding to each random point t is the simulated compression amount of the heat dissipation pad 15. In this embodiment, the design range of the compression amount of the heat dissipation pad 15 is between 0.15 mm and 0.4 mm, so the design center value is 0.275 mm. Moreover, the tolerances of the casing 11, the heat sink 14, the heat dissipation pad 15, the CPU 13, and the circuit board 12 are sampled in a manner similar to that shown in FIG. 6A and FIG. 6B. In this way, a large amount of simulation data can be generated for training the neural network model 132.

In Step S106, since a plurality of tolerance data sets (a2, b2, c2, d2, e2) are input into the key parameter generation module 130, a plurality of key parameters will be generated accordingly, that is, the compression amounts of the heat dissipation pad 15. After that, Step S108 is performed to input the tolerance data sets (a2, b2, c2, d2, e2) corresponding to the key parameters located within the design range into the assembly yield calculation module 140 to calculate a plurality of assembly yield rates. The so-called assembly yield rate refers to the yield rate of the assembled product if the parts that meet the tolerances set by the tolerance data sets (a2, b2, c2, d2, e2) are assembled. It should be noted that, in FIG. 5, the line segment fed back to the input layer 132a from the output layer 132c represents the optimal tolerance data set (a2, b2, c2, d2, e2) that is indirectly derived from the calculated key parameters.

Before performing Step S108, the key parameters that are not located within the design range will be eliminated first. In this embodiment, the design range is 0.1 mm to 0.4 mm. In other words, if the calculated compression amount is not located within the range of 0.1 mm to 0.4 mm, Step S108 won't be performed. On the contrary, if the calculated compression amount is located within the range of 0.1 mm to 0.4 mm, the corresponding tolerance data set (a2, b2, c2, d2, e2) will be input to the assembly yield calculation module 140 for calculating the yield rate of the assembled product. After that, Step S110 is performed. Among the plurality of calculated assembly yield rates, the tolerance data set corresponding to one of the assembly yield rates is selected as the tolerances of the parts in the assembled product. Generally speaking, the tolerance data set corresponding to the highest assembly yield rate is used as the tolerances of the parts in the assembled product. For example, if the calculated key parameters are used, the calculated key parameter is 0.1 mm when the tolerance data set (a2, b2, c2, d2, e2) is (0.35, 0.15, 0.08, 0.28, 0.18), which has the highest assembly yield rate. Then, this set of digitals (0.35, 0.15, 0.08, 0.28, 0.18) can be used as the tolerances of the casing 11, the heat sink 14, the heat dissipation pad 15, the CPU 13, and the circuit board 12. In this embodiment, Step S108 uses MITCalc to calculate the assembly yield rate. Certainly, those with ordinary knowledge in the field can also use other mathematical models to deduce the assembly yield rate from the tolerances of the parts.

In the above Step S108, the number of key parameters that meet the design range may be very large, resulting in a waste of computing resources. Therefore, in other embodiments, at least one key parameter (generally, a plurality key parameters) closest to the boundary of the design range can be selected, and at least one assembly yield rate is calculated according to the tolerance data set corresponding to the selected key parameter(s). The reason is that, based on the inventor's simulation experience, when the calculated key parameter is located at the boundary of the design range, especially when closest to the boundary of the design range is the boundary with a smaller index value, the corresponding assembly yield rate is usually the highest. For example, assuming that there are sixty tolerance data sets (a2, b2, c2, d2, e2) correspond to the key parameter 0.1 mm (that is, the calculated compression amount is 0.1 mm), then these sixty tolerance data sets (a2, b2, c2, d2, e2) are substituted into the assembly yield calculation module 140. Among the sixty calculated assembly yield rates, the tolerance data set corresponding to the highest assembly yield rate (a2, b2, c2, d2, e2) is for example (0.38, 0.18, 0.05, 0.25, 0.15). Then, this set of digitals (0.38, 0.18, 0.05, 0.25, 0.15) will be used as the tolerances of the casing 11, the heat sink 14, the heat dissipation pad 15, the CPU 13, and the circuit board 12.

Fundamentally, in Step S102, the user needs to determine the initial tolerances of the parts in the assembled product. The initial tolerances may be improperly determined, which may cause the number of key parameters generated in Step S106 and conforming to the design range to be less than a predetermined number, such as 20. Thus, the number of samples may be too small. At this time, it is necessary to return to Step S102 to re-determine the initial tolerances of the parts in the assembled product, and perform Step S102 to Step S108 again.

In summary, the dimension tolerance determination system and the dimension tolerance determining method of the above embodiments adopt neural network technology for determining the tolerances of the parts, thereby effectively improving the assembly yield rate. An assembled product made up of some parts of a notebook computer is taken as an example, but those skilled in the art should understand that the dimension tolerance determination system and the dimension tolerance determining method of the present invention can be applied to the tolerances of various parts in various assembled products.

Although the present invention has been disclosed through the above embodiments, the scope of the present invention is not limited thereto. Without departing from the concept of the present invention, the above components can be replaced with similar or equivalent elements understood by those skilled in the art.

What is claimed is:

1. A dimension tolerance determination system, suitable for determining tolerances of parts in an assembled product, the dimension tolerance determination system comprising:
an input module, suitable for a user to input initial tolerances of the parts in the assembled product;
a tolerance generation module, electrically connected to the input module, the tolerance generation module is configured for generating a plurality of tolerance data sets according to the initial tolerances of the parts, each tolerance data set containing a calculated part tolerance of each part;
a key parameter generation module, electrically connected to the tolerance generation module, the key parameter generation module is configured for generating a plurality of key parameters corresponding to the assembled product according to the plurality of tolerance data sets, wherein each key parameter corresponds to one of the tolerance data sets;
an assembly yield calculation module, electrically connected to the key parameter generation module, the assembly yield calculation module is configured for selecting a key parameter located within a design range, and for calculating a plurality of assembly yield rates based on the tolerance data sets corresponding to the key parameters located within the design range;
wherein the key parameter generation module comprises a neural network model.

2. The dimension tolerance determination system according to claim 1, wherein the key parameter generation module selects at least one key parameter closest to a boundary of the design range, and calculates at least one assembly yield rate according to the tolerance data set corresponding to the selected key parameter.

3. The dimension tolerance determination system according to claim 2, wherein the closest to the boundary of the design range is a boundary with a smaller index value.

4. The dimension tolerance determination system according to claim 1, wherein the tolerance generation module uses a Monte Carlo method and a dimension distribution range of the parts for generating the plurality of tolerance data sets.

* * * * *